United States Patent [19]
Chikaraishi et al.

[11] Patent Number: 5,705,445
[45] Date of Patent: Jan. 6, 1998

[54] BASE FABRIC FOR AIR BAGS AND METHOD FOR THE PREPARATION THEREOF

[75] Inventors: Tsuneo Chikaraishi; Yasushi Masuda, both of Shiga-ken; Hiroshi Ohashi, Kunma-ken; Yoshinobu Takahashi; Morizo Nakazato, both of Gunma-ken; Takeshi Fukuda, Tokyo, all of Japan

[73] Assignees: Takata Corporation; Shin-Etsu Chemical Co., Ltd., both of Tokyo, Japan

[21] Appl. No.: 488,010

[22] Filed: Jun. 7, 1995

[30] Foreign Application Priority Data

Sep. 16, 1994 [JP] Japan ............. 6-221771

[51] Int. Cl.$^6$ ............. B32B 27/12; B32B 27/28
[52] U.S. Cl. ............. 442/104; 442/106; 428/36.1
[58] Field of Search ............. 428/36.1, 36.8, 428/266, 267, 272, 290; 442/104, 136

[56] References Cited

U.S. PATENT DOCUMENTS

| | | |
|---|---|---|
| 3,817,894 | 6/1974 | Butler et al. |
| 4,221,688 | 9/1980 | Johnson et al. |
| 4,228,054 | 10/1980 | Ona et al. |
| 4,805,930 | 2/1989 | Takada. |
| 5,232,611 | 8/1993 | Ohashi et al. ............. 252/8.6 |
| 5,254,621 | 10/1993 | Inoue et al. |
| 5,296,298 | 3/1994 | Fujimoto et al. ............. 428/447 |
| 5,298,317 | 3/1994 | Takahashi et al. ............. 428/266 |
| 5,401,566 | 3/1995 | Magee et al. ............. 428/36.1 |

FOREIGN PATENT DOCUMENTS

| | | |
|---|---|---|
| 535649 | 9/1992 | European Pat. Off. |
| 643106 | 9/1994 | European Pat. Off. |
| 63-078744 | 4/1988 | Japan. |

*Primary Examiner*—Marion E. McCamish
*Assistant Examiner*—Elizabeth M. Cole
*Attorney, Agent, or Firm*—Millen, White, Zelano & Branigan, P.C.

[57] ABSTRACT

Disclosed is a base fabric for automobile air bags having excellent flexibility to ensure compact folding of the air bag and high flame retardancy for safety in hazard, which consists of a woven fabric web and a rubbery coating layer formed thereon from a silicone-based coating composition in the form of an aqueous emulsion comprising: (a) 100 parts by weight of an organopolysiloxane represented by the general formula

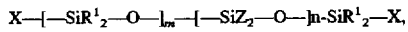

$$X-[-SiR^1_2-O-]_m-[-SiZ_2-O-]_n-SiR^1_2-X,$$

in which $R^1$ is a monovalent hydrocarbon group having 1 to 20 carbon atoms, Z is $R^1$, $OR^2$ or $-(-O-SiR^1_2-)_k-OR^2$, $R^2$ being a hydrogen atom or $R^1$ and k being a positive integer not exceeding 1000, X is $R^1$ or $OR^2$, m is a positive integer of 100 to 10,000 and n is 0 or a positive integer not exceeding 1,000 and which contains at least two $OR^2$ groups in a molecule; (b) from 0.5 to 50 parts by weight of an organohydrogen polysiloxane having, in a molecule, at least three silicon-bonded hydrogen atoms; (c) from 0.5 to 100 parts by weight of a finely divided silica filler or a powder of an polyorganosilsesquioxane; (d) from 0.1 to 20 parts by weight of an alkoxy silane compound having, in a molecule, at least one amido group and at least one carboxyl group or a partial hydrolysis-condensation product thereof; (e) from 0.1 to 20 parts by weight of an alkoxy silane compound having, in a molecule, at least one epoxy or amino group or a partial hydrolysis-condensation product thereof; and (f) from 0.01 to 10 parts by weight of a curing catalyst for the composition.

20 Claims, No Drawings

BASE FABRIC FOR AIR BAGS AND METHOD FOR THE PREPARATION THEREOF

BACKGROUND OF THE INVENTION

The present invention relates to a base fabric for air bags in automobiles having excellent flexibility and flame-retardancy as well as a method for the preparation thereof as well as an air bag for automobiles prepared by sewing together pieces of the base fabric.

As is known, conventional base fabrics for automobile air bags are prepared by forming a coating layer of an elastomeric coating composition based on a polychloroprene rubber, polybutadiene rubber and the like on a woven fabric of a synthetic fiber such as polyester fibers, polyamide fibers and the like in order to impart the woven fabric with imperviousness against high-pressure gas ejected from the inflator in case of an accident. A problem in these conventional base fabrics for air bags is that the gas imperviousness cannot be high enough unless the elastomeric coating layer is formed with an unduly large thickness or coating amount so that the base fabric is so heavy and thick to give a touch feeling of stiffness. Accordingly, the air bags made from such a base fabric is necessarily poorly foldable into a compact form requiring a relatively large volume of the storage space. When the automobile having an air bag system is used in a very hot area, in addition, the temperature of the air bag stored around the steering wheel sometimes exceeds 100° C. while the air bags made of a conventional base fabric have relatively low heat resistance and weatherability not to be fully resistant against the ambient conditions of high temperature and humidity resulting in deterioration of the performance.

Various proposals and attempts of course have bee made to solve this problem. For example, Japanese Patent Kokai No. 63-78744 discloses a base fabric for air bags prepared by laminating a silicone rubber layer on one surface of a plain-woven fabric of which the filaments of the warfs and/or wefts are made from full-aromatic polyamide fibers. Further, U.S. Pat. No. 4,805,930 proposes an air bag made of several pieces of a base fabric of a synthetic fiber having a thin coating layer of a silicone rubber on the inwardly facing surface of the bag. Though with considerable improvement in the heat resistance and weatherability by virtue of the use of a silicone rubber, however, a problem left in the above described silicone rubber-coated base fabrics is that the silicone rubber-based coating composition must be prepared by using a large volume of an organic solvent for the adjustment of the viscosity or consistency to be suitable for the coating works. Use of a large volume of organic solvents is necessarily accompanied by various disadvantages. For example, there is a risk of inadvertent fire in the working environment by eventual electrostatic sparks and the like. Many organic solvents have toxicity against the human body so that the workers are always at a risk against their health due to inhalation of the solvent vapor or contacting of the solvent with their skin. Further, atmospheric pollution is caused by the emission of the solvent vapor to the open air so that installation of apparatuses is indispensable for the recovery of the solvent vapor produced in the drying process and the like. Accordingly, it is eagerly desired to develop a coating composition which can be used for coating without using an organic solvent in the preparation of base fabrics for air bags.

In order to comply with this requirement, coating compositions of an aqueous emulsion type have been proposed. For example, U.S. Pat. No. 4,221,688 proposes a silicone-based aqueous emulsion composition for coating having a pH value of 9.0 to 11.5 which comprises a hydroxylated organopolysiloxane, colloidal silica and organotin compound or organic amine compound. This coating composition, however, is not quite satisfactory as a coating material for the base fabric of air bags because adhesion of the coating layer to the woven web is poor in addition to the problem of strong alkalinity of the emulsion composition to causing various restrictions.

Various proposals have been made heretofore with an object to improve adhesion of the coating layer formed from such an emulsion composition to the woven fabric. For example, U.S. Pat. No. 4,228,054 proposes an organopolysiloxane-based latex composition prepared by the emulsion polymerization of a mixture of a cyclic organopolysiloxane oligomer and a functional group-containing organo trialkoxy silane such as aminoalkyl trialkoxy silanes and the like in an aqueous medium in the presence of a sulfonate-based or quaternary ammonium salt-based surface active agent. U.S. Pat. No. 3,817,894 proposes a silicone-based latex composition comprising an organopolysiloxane block copolymer consisting of dimethyl siloxane units and monophenyl siloxane units, water, cationic surface active agent, non-ionic surface active agent, filler and amino-functional organosilane compound. Further, U.S. Pat. No. 5,254,621 discloses a silicone-based aqueous emulsion composition comprising an emulsified organopolysiloxane having hydroxy groups, a reaction product of an amino-functional organosilane compound with an acid anhydride, an organosilane compound selected from epoxy-functional silane compounds and isocyanato group-containing silane compounds, colloidal silica and a curing catalyst. Though not ineffective, the improvement in the adhesion of the coating layer to the woven fabric is still insufficient in each of these coating compositions and the mechanical strength of the coating film thereof is low that the air bag prepared by sewing pieces of such a base fabric is not always strong enough to exhibit high resistance against tearing force along the sewing lines and, thus withstand the very severe working conditions including the instantaneous inflation of the bag by the high-pressure gas from the inflator.

On the other hand, Japanese Patent Kokai No. 5-16753 proposes a method for the preparation of an air bag which is impregnated with a liquid silicone resin by dipping a woven fabric of filaments therein with an object to improve the flexibility without unduly increasing the weight or thickness of the base fabric. This method is in fact effective to obtain a uniform coating layer on the fabric even when the coating amount is small so as not to unduly increase the weight of the fabric. This method, however, has a very serious defect that the tear strength of the air bag along the sewing lines is greatly decreased because the liquid resin impregnating the fabric acts as a lubricant between filaments of the fabric web.

At any rate, no effective method has been developed for obtaining a base fabric as a material of air bags having good flexibility leaving the matter of flame retardancy of the coated fabric as a problem to be solved in future.

SUMMARY OF THE INVENTION

The present invention accordingly has an object to provide a novel and improved base fabric for air bags free from the above described problems and disadvantages in the conventional base fabrics for air bags as well as a method for the preparation thereof.

Thus, the base fabric of the present invention for air bags is an integral web material which comprises:

(A) a woven fabric web of a synthetic fiber; and
(B) a coating layer on at least one surface of the woven fabric web as the component (A) which is a cured layer of an organopolysiloxane-based coating composition in the form of an aqueous emulsion having a viscosity in the range from 2,000 to 100,000 centipoise at 25° C. and comprising:
  (a) 100 parts by weight of an organopolysiloxane represented by the general formula $$X\!-\![-SiR^1_2-O-]_m-[-SiZ_2-O-]_n-SiR^1_2-X, \qquad (I)$$

in which $R^1$ is, each $R^1$ is independently from the others, a monovalent hydrocarbon group having 1 to 20 carbon atoms, Z is, each Z is independently from the others, $R^1$, $OR^2$ or $-(-O-SiR^1_2-)_k-OR^2$, $R^2$ being a hydrogen atom or $R^1$ and the subscript k being a positive integer not exceeding 1000, X is, each X is independently from the other, $R^1$ or $OR^2$, the subscript m is a positive integer of 100 to 10,000 and the subscript n is 0 or a positive integer not exceeding 1,000 and which contains at least two groups denoted by $OR^2$ in a molecule;
  (b) from 0.5 to 50 parts by weight of an organohydrogen polysiloxane having, in a molecule, at least three hydrogen atoms directly bonded to the silicon atoms;
  (c) from 0.5 to 100 parts by weight of a finely divided silica filler or a powder of an polyorganosilsesquioxane;
  (d) from 0.1 to 20 parts by weight of an alkoxy silane compound having, in a molecule, at least one amido group and at least one carboxyl group or a partial hydrolysis-condensation product thereof;
  (e) from 0.1 to 20 parts by weight of an alkoxy silane compound having, in a molecule, at least one epoxy group or at least one amino group or a partial hydrolysis-condensation product thereof; and
  (f) from 0.01 to 10 parts by weight of a curing catalyst for the composition,
the coating amount of the silicone composition being in the range from 10 to 100 g/m² or, preferably, in the range from 20 to 50 g/m² as dried.

It is sometimes advantageous that the coating composition in the form of an aqueous emulsion further contains a water-soluble polymer such as carboxymethyl cellulose with an object to impart the coating composition with a viscosity specified above and suitable for the coating work.

DETAILED DESCRIPTION OF THE PREFERRED EMBODIMENTS

The organopolysiloxane as the component (a) in the coating composition, from which the coating layer in the inventive base fabric for air bags is formed, is presented by the above given general formula (I), in which each of the groups denoted by $R^1$ is a monovalent hydrocarbon group having 1 to 20 carbon atoms exemplified by saturated aliphatic hydrocarbon groups such as methyl, ethyl, propyl, butyl, pentyl, hexyl, heptyl, octyl, decyl, dodecyl, tetradecyl and octadecyl groups, unsaturated aliphatic hydrocarbon groups such as vinyl and allyl groups, saturated alicyclic hydrocarbon groups such as cyclopentyl and cyclohexyl groups and aromatic hydrocarbon groups such as phenyl, tolyl and naphthyl groups as well as those substituted hydrocarbon groups obtained by replacing a part of the hydrogen atoms in the above named unsubstituted hydrocarbon groups with halogen atoms or organic groups having an epoxy, carboxyl, amino or methacryl group. Z in the general formula (I) is $R^1$, $OR^2$ or $(OSiR^1_2)_k-OR^2$, in which $R^2$ is a hydrogen atom or a monovalent hydrocarbon group having 1 to 20 carbon atoms, which is exemplified by the groups given as the examples of the group $R^1$ described above, and the subscript k is a positive integer not exceeding 1000. The terminal group denoted by X is $R^1$ or $OR^2$. The subscript m is a positive integer in the range from 100 to 10,000 or, preferably, from 1000 to 5000 and the subscript n is 0 or a positive integer not exceeding 1000 or, preferably, 0 or a positive integer not exceeding 100. When the value of m is too small, the base fabric coated with the silicone-based coating composition has low flexibility and, when the value of m is too large, the tear strength of the base fabric is decreased. When the value of n is too large, the flexibility of the base fabric is decreased. It is essential that the organopolysiloxane as the component (a) has at least two $OR^2$ groups per molecule from the standpoint of obtaining good reactivity for the crosslinking reaction with the organohydrogen polysiloxane as the component (b) described later. Although the general formula (I) indicates a straightly linear molecular structure, it is optional that the organopolysiloxane molecules contain a limited number of branches. It is preferable that at least 90% by moles of the groups denoted by $R^1$ are methyl groups.

Examples of the organopolysiloxane as the component (a) include those expressed by the following structural formulas, in which Me is a methyl group, Et is an ethyl group, Ph is a phenyl group, G, is a glycidyl group and the subscripts m, n and k each have the same meaning as defined above and the subscript L is a positive integer smaller than m:

HO—(—SiMe$_2$—O—)$_m$—SiMe$_2$—OH;
MeO—(—SiMe$_2$—O—)$_m$—SiMe$_2$—OMe;
EtO—(—SiMe$_2$—O—)$_m$—SiMe$_2$—OEt;
HO—(—SiMe$_2$—O—)$_m$—[—SiMe(OMe)—O—]$_n$—SiMe$_2$—OH;
HO—(—SiMe$_2$—O—)$_m$—[—SiMe(OH)—O—]$_n$—SiMe$_2$—OH;
MeO—(—SiMe$_2$—O—)$_m$—[—SiMe(OMe)—O—]$_n$—SiMe$_2$—OMe;
Me—(—SiMe$_2$—O—)$_m$—[—SiMe(OMe)—O—]$_n$—SiMe$_2$—OMe;
Me—(—SiMe$_2$—O—)$_m$—[—SiMe(OMe)—O—]$_n$—SiMe$_2$—Me;
EtO—(—SiMe$_2$—O—)$_L$—[—SiMe(C$_3$H$_6$NH$_2$)—O—]$_m$-$_L$—[—SiMe(OEt)—O—]$_n$—SiMe$_2$—OEt;
MeO—(—SiMe$_2$—O—)$_L$—[—SiMe(C$_3$H$_6$OG)—O—]$_m$-$_L$—[—SiMe(OMe)—O—]$_n$—SiMe$_2$—OMe;
HO—(—SiMe$_2$—O—)$_m$—[—SiPh(OH)—O—]$_n$—SiMe$_2$—OH;
MeO—(—SiMe$_2$—O—)$_m$—(—SiMeA$^1$—O—)$_n$—SiMe$_2$—OMe, A$^1$ being a group of the formula —(—O—SiMe$_2$—)$_k$—OMe; and
EtO—(—SiMe$_2$—O—)$_m$—(—SiA$^2_2$—O—)$_n$—SiMe$_2$—OEt, A$^2$ being a group of the formula —(—O—SiMe$_2$—)$_k$—OEt.

The organopolysiloxane as the component (a) can be synthesized by a known method. For example, a cyclic organopolysiloxane oligomer such as octamethyl cyclotetrasiloxane and an oligomeric α, ω-dihydroxy polydimethyl siloxane or an organoalkoxy silane compound are subjected to the siloxane rearrangement equilibration reaction in the presence of an alkaline catalyst such as alkali metal hydroxides to give a hydroxy group-containing or alkoxy group-containing organopolysiloxane suitable as the component (a).

Alternatively, the above mentioned organopolysiloxane can be easily prepared in the form of an aqueous emulsion by a known emulsion polymerization method, in which a cyclic organopolysiloxane oligomer, organo alkoxy silane compound and the like are dispersed and emulsified in an aqueous medium by use of an anionic or cationic surface active agent followed by the addition of an acid or alkali as a catalyst to effect polymerization of the organopolysiloxanes.

The above mentioned organo alkoxy silane compound used as one of the starting materials in the emulsion polymerization is represented by the general formula $R^1{}_p Si(OR^2)_{4-p}$, in which $R^1$ and $R^2$ each have the same meaning as defined above and the subscript p is 0, 1 or 2. Examples of the organo alkoxy silane compound include dimethyl dimethoxy silane, dimethyl diethoxy silane, methyl trimethoxy silane, methyl triethoxy silane, phenyl trimethoxy silane, phenyl triethoxy silane, 3-aminopropyl trimethoxy silane, 3-aminopropyl triethoxy silane, N-(2-aminoethyl-3-aminopropyl trimethoxy silane, 3-glycidyloxypropyl trimethoxy silane, tetraethoxy silane and the like.

It is preferable that the organopolysiloxane as the component (a) is used in the form of an aqueous emulsion.

The component (b) in the silicone-based coating composition used as the coating material for the preparation of the inventive base fabric is an organohydrogenpolysiloxane having, in a molecule, at least 3 hydrogen atoms directly bonded to the silicon atoms and serves as a crosslinking agent of the organopolysiloxane as the component (a). The organohydrogenpolysiloxane is represented by the general formula

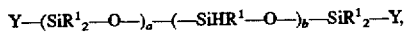

in which $R^1$ has the same meaning as defined above, Y is a hydrogen atom or $R^1$ and the subscripts a and b are each a positive integer not exceeding 1000 with the proviso that, when b is 1, each Y is a hydrogen atom and, when b is 2, at least one of the two Ys is a hydrogen atom. Although the above given general formula represents a straightly linear molecular structure, it is merely typical and the organohydrogenpolysiloxane can optionally contain branched siloxane units.

Examples of the organohydrogenpolysiloxane as the component (b) include those expressed by the following formulas:

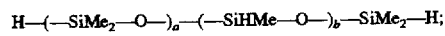

and

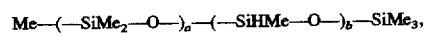

in which Me is a methyl group.

The organohydrogenpolysiloxane as the component (b) can be prepared, similarly to the organopolysiloxane as the component (a), by a known method such as the siloxane rearrangement equilibration reaction or emulsion polymerization of a mixture of a cyclic organohydrogensiloxane oligomer and hexamethyl disiloxane or tetramethyl dihydrogen disiloxane or the cohydrolysis-condensation reaction of methyl dichloro silane, trimethyl chloro silane, dimethyl chloro silane and the like. It is preferable that the organohydrogenolysiloxane as the component (b) is used in the form of an aqueous emulsion.

The compounding amount of the component (b) in the coating composition is in the range from 0.5 to 50 parts by weight or, preferably, from 1 to 30 parts by weight per 100 parts by weight of the component (a). When the amount thereof is too small, the crosslinking density is not high enough, thus, causing a decrease in the mechanical strength of the silicone rubber film formed by curing of the coating composition while, when the amount is too large, the cured silicone rubber film is stiff and poorly flexible.

The component (c) is a fine powder of silica or a polysilsesquioxane which serves to increase the mechanical strength of the cured silicone rubber film and to improve the flame retardancy thereof. So-called colloidal silica can be used as such or, preferably, used in the form of an aqueous dispersion thereof by dispersing the powder using a surface active agent. It is optional that the powder is dispersed in an aqueous medium by using a surface active agent after mixing with the organopolysiloxane as the component (a) and the organohydrogenpolysiloxane as the component (b). Alternatively, an aqueous emulsion or dispersion of a silica powder or polysilsesquioxane powder can be obtained by the hydrolysis-condensation reaction of an organo alkoxy silane represented by the general formula $R^1{}_q Si(OR^2)_{4-q}$, in which $R^1$ and $R^2$ each have the same meaning as defined above and the subscript q is 0 or 1, emulsified in advance in an aqueous medium containing a surface active agent followed by the addition of an alkaline catalyst such as alkali metal hydroxides.

The compounding amount of the component (c) in the coating composition is in the range from 0.5 to 100 parts by weight or, preferably, from 1 to 50 parts by weight per 100 parts by weight of the component (a). When the amount thereof is too small, no improvement can be obtained in the mechanical strength and flame retardancy of the cured silicone rubber film while, when the amount is too large, the cured silicone rubber film is rigid and brittle, causing a decrease in the mechanical strength and flexibility of the base fabric coated with the coating composition.

The component (d) in the coating composition is an organo alkoxy silane having both of an amido group and a carboxyl group in a molecule or a partial hydrolysis-condensation product thereof. This component serves to increase the adhesive bonding strength between the cured silicone rubber film and the fibers of the woven web on which the silicone rubber film is formed. Such a compound can be prepared by reacting an anhydride of a dibasic carboxylic acid with an aminoalkyl alkoxy silane or a partial hydrolysis-condensation product thereof.

The above mentioned aminoalkyl alkoxy silane compound as the starting material for the preparation of the component (d) is represented by the general formula $ASiR^1{}_r (OR^2)_{3-r}$, in which $R^1$ and $R^2$ each have the same meaning as defined above, A is an amino-substituted monovalent hydrocarbon group of the general formula $-R^3(NR^2R^3)_s NR^2{}_2$, $R^2$ having the same meaning as defined above with the proviso that at least one of the groups $R^2$ is a hydrogen atom, $R^3$ being a divalent hydrocarbon of 1 to 6 carbon atoms and the subscript s being 0 or a positive integer, and the subscript r is 0, 1 or 2. Particular examples of the aminoalkyl alkoxy silane compound include:

3-aminopropyl methyl diethoxy silane;
3-aminopropyl triethoxy silane;
3-[N-(2-aminoethyl)amino]propyl methyl dimethoxy silane;
3-[N-(2-aminoethyl)amino]propyl trimethoxy silane;
3-(N-methylamino)proyl tripopoxy silane;
3-[N-(2-dodecylaminoethyl)amino]propyl trimethoxy silane;
4-[N-(2-benzylmethylaminoethyl)amino]butyl trimethoxy silane;

3-[N-2-(2-aminoethyl)amino]propyl triethoxy silane; as the like.

The dibasic carboxylic acid anhydride to be reacted with the above mentioned aminoalkyl alkoxy silane compound in the preparation of the component (d) is exemplified by phthalic acid anhydride, succinic acid anhydride, methylsuccinic acid anhydride, maleic acid anhydride, glutaric acid anhydride, itaconic acid anhydride and the like.

The component (d) can be readily prepared by agitating a solution of the above described two reactants in an organic solvent which is a good solvent for both reactants, such as alcohols, at room temperature for 1 to 5 hours. Since it is essential that the reaction production mentioned above as the component (d) has at least one amido group and at least one carboxyl group per molecule, the amount of the dibasic acid anhydride as one of the reactants must be at least equimolar to the —NH— groups in the aminoalkyl alkoxy silane compound or a partial hydrolysis-condensation product thereof.

The compounding amount of the component (d) in the coating composition is in the range from 0.1 to 20 parts by weight or, preferably, from 0.5 to 10 parts by weight per 100 parts by weight of the component (a). When the amount thereof is too small, no improvement can be obtained in the adhesive bonding strength between the woven fabric web and the coating layer while, when the amount is too large, the cured silicone rubber film is rigid and brittle, causing a decrease in the flexibility.

The component (e) in the coating composition is an epoxy group- or amino group-containing alkoxy silane compound or a partial hydrolysis-condensation product thereof and serves to improve the flexibility of the coating layer and the adhesive bonding strength thereof to the woven fabric web. Examples of the component (e) include: 3-glycidyloxypropyl trimethoxy silane; 2-(3,4-epoxycyclohexyl)ethyl methyl dimethoxy silane; 3-aminopropyl triethoxy silane; N-(2-aminoethyl)-3-aminopropyl methyl dimethoxy silane; N-cyclohexyl-3-aminopropyl trimethoxy silane; 3-morpholinopropyl methyl dimethoxy silane and the like.

The compounding amount of the component (e) in the coating composition is in the range from 0.1 to 20 parts by weight or, preferably, from 0.5 to 10 parts by weight per 100 parts by weight of the component (a). When the amount thereof is too small, no improvement can be obtained in the flexibility of the coating layer and adhesive bonding strength between the woven fabric web and the coating layer while, when the amount is too large, the cured silicone rubber film is rigid with decreased flexibility due to the excessively high crosslinking density.

The component (f) is a curing catalyst for promoting the curing reaction of the other components in the coating composition. Examples of suitable curing catalysts include metal salts of organic acids such as dibutyltin dilaurate, dibutyltin dioctoate, dioctyltin dilaurate, dioctyltin diacetate, tin octoate, zinc stearate, since octoate, zinc acetate, iron octoate and the like and amine compounds such as n-hexylamine, guanidine and the like. These catalyst compounds, if insoluble in water, are used preferably in the form of an aqueous dispersion or emulsion prepared in advance by using a surface active agent.

The compounding amount of the component (f) in the coating composition is in the range from 0.01 to 10 parts by weight or, preferably, from 0.1 to 5 parts by weight per 100 parts by weight of the component (a) depending on the desired curing velocity. When the amount thereof is too small, the coating layer of the composition cannot be fully cured so that the coating layer cannot be imparted with high mechanical strengths while, when the amount is too large, the properties of the cured silicone rubber film are adversely affected by the catalyst compound decomposition products thereof remaining in the cured coating layer as a non-volatile impurity.

As is described above, one or more of the above described components (a) to (f) are used preferably in the form of an aqueous emulsion prepared by using a surface active agent. Examples of surface active agents suitable for this purpose include, though not particularly limitative, anionic surface active agents such as salts of alkyl sulfates, salts of alkylbenzene sulfonates, salts of alkyl phosphoric acids and the like, non-ionic surface active agents such as polyoxyethylene alkyl ethers, polyoxyethylene alkylphenyl ethers, polyoxyethylene fatty acid esters, sorbitan fatty acid esters and the like, cationic surface active agents such as quaternary ammonium salts, alkylamine acetates and the like and amphoteric surface active agents such as alkyl betaines, alkyl imidazolines and the like.

The coating composition used in the preparation of the inventive base fabric for air bags can be compounded according to need with various kinds of known additives conventionally used in fabric-finishing agents including thickening agents, antifoam agents, penetrants, antistatic agents, inorganic fillers, antiseptic agents and the like each in a limited amount.

Though not particularly limitative, the woven fabric web, on which a cured silicone rubber-based coating layer is formed from the above described coating composition to prepare the inventive base fabric for air bags, is preferably a plain-woven fabric of synthetic fibers such as polyamide fibers, polyester fibers, acrylic fibers, aramid fibers and the like in the form of filaments, staples or a combination thereof in respect of the strength and heat resistance of the fiber per se.

The method for coating of a woven fabric web with the coating composition is not particularly limitative and any known methods can be applied including knife coating, roller coating, spray coating, dipping and the like. The woven fabric web is coated either on a single surface or on both surfaces although single-surface coating is preferable in order that the coated base fabric has good flexibility. The coating work is followed by curing of the coating layer or layers, preferably, by heating in order to accelerate curing of the coating composition although curing of the coating composition can proceed even at room temperature. When adequately cured, the silicone rubber-based coating layer has good rubbery elasticity.

It is important that the coating composition has an appropriate viscosity in order to the coated base fabric to have properties suitable as a material of air bags. For example, the coating composition should have a viscosity in the range from 2,000 to 100,000 centipoise or, preferably, from 10,000 to 50,000 centipoise at the coating temperature or, typically, at 25° C. When the viscosity of the coating composition is too low, the coating composition is infiltrated into the whole thickness of the woven fabric web so that the coated base fabric is unduly stiff after curing without flexibility so as not to be suitable as a material of air bags. Additionally, there is a decrease in the flame retardancy. When the viscosity of the coating composition is too high, on the other hand, difficulties are encountered in the coating work hindering uniformity of the coating layer and the coating amount is sometimes too large so that the coated base fabric is too heavy and has low flexibility. When the viscosity of the coating composition is too low, the viscosity can be adjusted by the addition of a suitable water-soluble polymer as a thickening agent such as carboxymethyl cellulose, polyacrylic acid, starch, casein and the like, of which carboxymethyl cellulose is preferred in respect of workability.

The coating amount of the woven fabric web with the coating composition as cured is preferably in the range from 10 to 100 g/m² or, preferably, from 20 to 50 g/m² as dried. When the coating amount is too small, no sufficient improvement can be obtained in the strength of the base fabric along the sewing lines of the air bag and in the flame retardancy. When the coating amount is too large, the air bag formed of the coasted base fabric is too heavy and has low flexibility.

When an air bag is formed of the inventive base fabric having a coating layer of the silicone rubber-based coating composition, the thickness of the coating layer can be so as compared with a coating layer of a conventional polychloroprene rubber-based coating composition by virtue of the unique characteristics of silicone rubbers in general that the coating layer is free from occurrence of pinholes even when the thickness of the coating layer is very small. The coated base fabric is fully flexible such that the air bag can be folded very compactly and consequently the magazine for holding of the air bag can also be very compact contributing to the roominess of automobile rooms.

In addition, the higher flexibility of the inventive base fabric having a silicone rubber-based coating layer, contrary to an polychloroprene rubber-based coating layer ensures very rapid and smooth inflation of the air bag to increase the safety of the automobile driver and passengers in an emergency or accident. This advantage is partly due to the fact that the coefficient of friction is relatively small between surfaces of two silicone rubber layers with good slipperiness not to hinder the relative slipping of the silicone rubber-coated base fabric surfaces of an air bag in a compactly folded state as contained in the air bag magazine. Accordingly, the sewing threads along the sewing lines of the air bag are safe from the damage due to the heat generated by friction and can withstand the force caused by the inflation at an extremely high velocity.

By use of the inventive silicone rubber-coated base fabric for the preparation of air bags, the air bag can be folded more compactly and with a wider choice of the folding manner so that the productivity of the manufacturing process of air bags can be improved. Further, the excellent heat stability of silicone rubbers prevents degradation of the air bag made of a silicone rubber-coated base fabric even under the influence of the pressurized gas at high temperature from the inflator so as to ensure very reliable and smooth inflation of the air bag in any emergent moment. Moreover, flexibility of a silicone rubber is little influenced by the temperature changes so that reliability of the air bag can be ensured even in a hot district such as the tropical zone and cold district such as the frigid zone.

In the following, the base fabric of the invention for air bags is illustrated in more detail by way of examples as preceded by a description of teh preparation procedures for the respective ingredients in the silicone rubber-based coating composition. In the following description, the term of "parts" always refers to "parts by weight".

Preparation 1

Into a polyethylene beaker of 2 liter capacity were introduced 500 g of octamethyl cyclotetrasiloxane, 5.4 g of phenyl triethoxy silane and 100 g of a 10% by weight aqueous solution of dodecylbenzene sulfonic acid and they were thoroughly mixed together by using a homomixer followed by gradual addition of 394.6 g of water so as to form an aqueous dispersion which was passed twice through a high-pressure homogenizer under a pressure of 300 kg/cm² to give a stable aqueous emulsion. Thereafter, this aqueous emulsion was transferred into a glass flask of 2 liter capacity equipped with a stirrer, thermometer and reflux condenser and heated at 50° C. for 24 hours under agitation to effect ring-opening polymerization of the octamethyl cyclotetrasiloxane. The aqueous emulsion of the organopolysiloxane was kept at 25° C. for 24 hours after completion of the polymerization reaction followed by neutralization with addition of a 10% by weight aqueous solution of sodium carbonate. The thus obtained aqueous emulsion of organopolysiloxane, which is referred to as the emulsion A hereinafter, contained 45.5% by weight of non-volatile matters as determined by drying at 105° C. for 3 hours. The organopolysiloxane contained in the aqueous emulsion was subjected to the analysis by the methods of gel permeation chromatography, infrared absorption spectrophotometry and nuclear magnetic resonance spectroscopy and could be identified to be an organopolysiloxane expressed by the structural formula

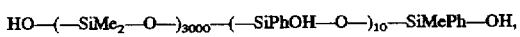

in which Me is a methyl group and Ph is a phenyl group.

Preparation 2

Into a glass flask of 1 liter capacity equipped with a stirrer, thermometer and reflux condenser were introduced 600 g of 1,3,5,7-tetramethyl cyclotetrasiloxane, 32.4 g of hexamethyl disiloxane and 12.6 g of sulfuric acid and the mixture was agitated at room temperature for 12 hours to effect the ring-opening polymerization of the cyclosiloxane oligomer followed by neutralization with addition of 21.6 g of sodium carbonate. The thus obtained product was subjected to the analysis by the methods of gel permeation chromatography, infrared absorption spectrophotometry and nuclear magnetic resonance spectroscopy and could be identified to be an organohydrogenpolysiloxane expressed by the structural formula

in which Me is a methyl group.

A 300 g portion of the above prepared organohydrogenpolysiloxane and 50 g of a polyoxyethylene nonylphenyl ether (10 moles addition of ethylene oxide) were introduced into a polyethylene beaker of 2 liter capacity and they were agitated with a homo-mixer uniformly followed by the addition of 650 g of water to form an aqueous dispersion of the organohydrogenpolysiloxane. The thus obtained aqueous dispersion was passed twice through a high-pressure homogenizer under a pressure of 300 kg/cm² to give a stable aqueous emulsion which is referred to as the emulsion B hereinafter.

Preparation 3

Into a glass flask of 1 liter capacity equipped with a stirrer, thermometer, reflux condenser and dropping funnel were introduced 98 g of maleic anhydride and 319 g of ethyl alcohol to form a uniform solution into which 221 g of 3-aminopropyl triethoxy silane were added dropwise at room temperature over a period of 1 hour. Thereafter, agitation of the mixture was continued for further 1 hour to effect the reaction to give a clear and light yellow solution, which is referred to as the solution D hereinafter. The solution D contained 48.6% by weight of non-volatile matters as determined by evaporating the solvent at 105° C. for 3 hours. The reaction product could be identified by the methods of gel permeation chromatography, infrared absorption spectrophotometry and nuclear magnetic resonance spectrometry to be a compound expressed by the following structural formula:

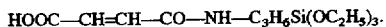

$HOOC-CH=CH-CO-NH-C_3H_6Si(OC_2H_5)_3$.

Preparation 4

Into a polyethylene beaker of 2 liter capacity were introduced 300 g of dioctyltin dilaurate and 50 g of a polyoxyethylene nonylphenyl ether (10 moles addition of ethylene oxide) and they were uniformly agitated with a homomixer followed by the addition of 650 g of water to give an aqueous dispersion which was passed twice through a high-pressure homogenizer under a pressure of 300 kg/cm² to give a stable aqueous emulsion which is referred to as the emulsion F hereinafter.

Example 1

A silicone-based coating composition was prepared in the following manner. Thus, 75 parts of a colloidal silica dispersion containing 15 parts of non-volatile matter (Snowtex C, a product by Nissan Chemical Co.) as the component (c) were admixed under agitation with 10 parts of the solution D containing 4.9 parts of non-volatile matter as the component (d) and then with 3 parts of 3-glycidyloxypropyl trimethoxy silane as the component (e) followed by further continued agitation for 30 minutes to give a uniform dispersion.

In the next place, the above prepared dispersion was gradually added under agitation to 220 parts of the emulsion A containing 100 parts of non-volatile matter as the component (a) followed by the addition of 4 parts of the emulsion F containing 1.2 parts of non-volatile matter as the component (f) and 30 parts of the emulsion B containing 9 parts of non-volatile matter as the component (b). Thereafter, the viscosity of the thus obtained aqueous emulsion having a viscosity of about 10 centipoise was increased to 30,000 centipoise by the admixture of a carboxymethyl cellulose (Cellogen F, a product by Dai-ichi Kogyo Seiyaku Co.) to give a silicone-based coating composition.

A plane-woven fabric web of 66-nylon filaments having a fineness of 420 deniers with a 46 counts/inch in the warp and weft was coated on one surface with the thus prepared coating composition by knife coating in a coating amount, determined from the weight increase by coating, of 32 g/m² as dried and heated at 150° C. for 2 minutes to effect curing of the coating layer.

The silicone-coated base fabric for air bags prepared in the above described manner was subjected to evaluation tests for the following items by the testing procedures respectively described there. The results of testing are summarized in Table 1 to follow, which also shows the results obtained with the woven fabric web before coating for the control purpose.

Flexibility

The bending resistance in g was measured for the test cloth of 15 cm width by using an Uenoyama-type feeling tester. A smaller value here obtained means higher flexibility or lower rigidity.

Tear strength along sewing line

Two test cloth pieces of 5 cm width were laid one on the other and sewed together on a sewing machine with a polyester thread along the 5 cm-long line 5 mm apart from one of the ends. Thereafter, the free ends of the respective pieces were pulled in opposite directions until tearing of the cloths took place along the sewing line to record the force in kgf required therefor.

Flame retardancy

Measurement was performed according to the FMVSS 302 method to determine the burning velocity in mm/minute. The test cloth was found to be acceptable when the burning velocity did not exceed 101.2 mm/minute.

Example 2

The experimental procedure was substantially the same as in Example 1 except that the amounts of the components (b), (c), (d), (e) and (f) added to the same amount of the emulsion A in the preparation of the coating composition were changed to:

(b) 4 parts of the emulsion B containing 1.2 parts of non-volatile matter;

(c) 5 parts of the colloidal silica dispersion containing 1 part of non-volatile matter;

(d) 1.1 parts of the solution D containing 0.5 part of non-volatile matter;

(e) 0.5 part of the silane compound; and (f) 0.4 part of the emulsion F containing 0.1 part of non-volatile matter, respectively, and the coating amount with the coating composition was 33 g/m² as dried.

The results of the evaluation tests of the thus prepared base fabric for air bags are shown in Table 1.

Example 3

The experimental procedure was substantially the same as in Example 1 except that the amounts of the components (b), (c), (d), (e) and (f) added to the same amount of the emulsion A in the preparation of the coating composition were changed to:

(b) 100 parts of the emulsion B containing 30 parts of non-volatile matter;

(c) 250 parts of the colloidal silica dispersion containing 50 parts of non-volatile matter;

(d) 20 parts of the solution D containing 9.7 parts of non-volatile matter;

(e) 3 parts of the silane compound; and (f) 16 parts of the emulsion F containing 4.8 parts of non-volatile matter, respectively, and the coating amount with the coating composition was 29 g/m² as dried.

The results of the evaluation tests of the thus prepared base fabric for air bags are shown in Table 1.

Comparative Example 1

The experimental procedure was substantially the same as in Example 1 except that the component (b) was omitted in the formulation of the coating composition and the coating amount with the coating composition was 30 g/m² as dried.

The results of the evaluation tests of the thus prepared base fabric for air bags are shown in Table 1.

Comparative Example 2

The experimental procedure was substantially the same as in Example 1 except that the component (c) was omitted in the formulation of the coating composition.

The results of the evaluation tests of the thus prepared base fabric for air bags are shown in Table 1.

Comparative Example 3

The experimental procedure was substantially the same as in Example 1 except that the component (d) was omitted in the formulation of the coating composition.

The results of the evaluation tests of the thus prepared base fabric for air bags are shown in Table 1.

Comparative Example 4

The experimental procedure was substantially the same as in Example 1 except that the component (e) was omitted in the formulation of the coating composition and the coating amount with the coating composition was 30 g/m² as dried.

The results of the evaluation tests of the thus prepared base fabric for air bags are shown in Table 1.

Comparative Example 5

The experimental procedure was substantially the same as in Example 1 except that the component (f) was omitted in the formulation of the coating composition and the coating amount with the coating composition was 33 g/m² as dried.

The results of the evaluation tests of the thus prepared base fabric for air bags are shown in Table 1.

Example 4

The formulation of the coating composition was just the same as in Example 1 except that the amount of the carboxymethyl cellulose as a thickener was modified so that the resultant coating composition had a viscosity of 23,000 centipoise. The thus prepared coating composition was continuously applied using a kiss roll coater to a wet raw cloth woven on a water-jet loom in a coating amount of 27.0 g/m² as dried followed by preliminary drying at 80° C. for 1 minute and curing by heating at 180° C. for 1 minute to give a silicone rubber-coated base fabric for air bags.

The thus prepared base fabric was subjected to the evaluation tests for four items including the three items in the preceding examples and comparative examples as well as air permeability in cm³/cm²/second under a pressure difference of 12.7 mmH₂O using a fragile tester. The results of the evaluation tests are shown in Table 1.

Example 5

The experimental procedure was substantially the same as in Example 4 except that the coating amount on the woven fabric web with the coating composition was adjusted to 23.8 g/m² as dried. The results of the evaluation tests undertaken with the base fabric for air bags are shown in Table 1.

Example 6

The experimental procedure was substantially the same as in Example 4 except that the coating amount on the woven fabric web with the coating composition was adjusted to 13.5 g/m². The results of the evaluation tests undertaken with the base fabric for air bags are shown in Table 1.

Comparative Example 6

The experimental procedure was substantially the same as in Example 4 except that the coating amount on the woven fabric web with the coating composition was adjusted to 9.0 g/m² as dried. The results of the evaluation tests undertaken with the base fabric for air bags are shown in Table 1.

Comparative Example 7

The experimental procedure was substantially the same as in Example 4 except that the viscosity of the coating composition was adjusted to 300 centipoise by modifying the amount of the carboxymethyl cellulose and the coating amount on the woven fabric web with the coating composition was adjusted to 25.5 g/m² as dried. The results of the evaluation tests undertaken with the base fabric for air bags are shown in Table 1, in which the results obtained with an uncoated woven fabric web are also shown.

TABLE 1

| | Flexibility g | Tear strength, kgf | Flame retardancy, mm/minute | Air permeability, cm³cm²/sec. |
|---|---|---|---|---|
| Example | | | | |
| 1 | 22 | 75 | 52 | |
| 2 | 18 | 68 | 71 | |
| 8 | 27 | 94 | 81 | |
| 4 | 21 | 72 | 25 | <0.01 |
| 5 | 20 | 68 | 60 | <0.01 |
| 6 | 17 | 55 | 95 | <0.01 |

TABLE 1-continued

| | Flexibility g | Tear strength, kgf | Flame retardancy, mm/minute | Air permeability, cm³cm²/sec. |
|---|---|---|---|---|
| Comparative Example | | | | |
| 1 | 21 | 32 | 120 | |
| 2 | 18 | 26 | 183 | |
| 3 | 24 | 25 | 85 | |
| 4 | 35 | 29 | 92 | |
| 5 | 14 | 16 | 187 | |
| 6 | 16 | 34 | 125 | 0.10 |
| 7 | 29 | 22 | 110 | 0.20 |
| Control (uncoated) | 16 | 21 | *) | |

*) testing interrupted by strong dripping

What is claimed is:

1. A base fabric for air bags which comprises:

(A) a woven fabric web of a synthetic fiber; and (B) a coating layer formed on at least one surface of the woven fabric web as the component (A) which is a layer cured from an organopolysiloxane composition in the form of an aqueous emulsion comprising:

(a) 100 parts by weight of an organopolysiloxane, as an anionic emulsion polymerization product, represented by the general formula

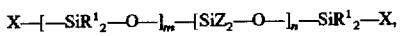

in which $R^1$ is, independently from the others, a monovalent hydrocarbon group having 1 to 20 carbon atoms optionally substituted by halogen atoms or epoxy, carboxyl, amino or methacryl groups, each Z is, independently from the others, $R^1$, $OR^2$ or $—(—O—SiR^1{}_2)_k—OR^2$, $R^2$ being a hydrogen atom or $R^1$ and the subscript k being a positive integer not exceeding 1000, each X is, independently from the other, $R^1$ or $OR^2$, the subscript m is a positive integer of 100 to 10,000 and the subscript n is 0 or a positive integer not exceeding 1,000 and which contains at least two groups denoted by $OR^2$ in a molecule;

(b) from 0.5 to 50 parts by weight of an organohydrogen polysiloxane, as an aqueous emulsion product, having, in a molecule, at least three hydrogen atoms directly bonded to the silicon atoms, (c) from 0.5 to 100 parts by weight of a finely divided silica filler, as a colloidal silica aqueous dispersion;

(d) from 0.1 to 20 parts by weight of an alkoxy silane compound having, in a molecule, at least one amido group and at least one carboxyl group or a partial hydrolysis-condensation product thereof;

(e) from 0.1 to 20 parts by weight of an alkoxy silane compound having, in a molecule, at least one epoxy group or at least one amino group or a partial hydrolysis-condensation product thereof;

(f) from 0.01 to 10 parts by weight of a curing catalyst for the composition, which is a metal salt of an organic acid or an amine compound; and (g) a water-soluble polymer thickening agent;

the aqueous emulsion having a viscosity in the range from 2,000 to 100,000 centipoise at 25° C. and the amount of the coating layer being the range from 10 to 100 g/m² as dried.

2. The base fabric for air bags as claimed in claim 1 in which the subscript n in the general formula representing the component (a) is 0 or a positive integer not exceeding 100.

3. The base fabric for air bags as claimed in claim 1 in which the amount of the component (c) is in the range from 1 to 50 parts by weight per 100 parts by weight of the component (a).

4. The base fabric for air bags as claimed in claim 1 in which the amount of the component (d) is in the range from 0.5 to 10 parts by weight per 100 parts by weight of the component (a).

5. The base fabric for air bags as claimed in claim 1 in which the amount of the component (e) is in the range from 0.5 to 10 parts by weight per 100 parts by weight of the component (a).

6. The base fabric for air bags as claimed in claim 1 in which the curing catalyst as the component (f) is a metal salt of an organic acid.

7. The base fabric for air bags as claimed in claim 1 in which the amount of the component (f) is in the range from 0.1 to 5 parts by weight per 100 parts by weight of the component (a).

8. The base fabric for air bags as claimed in claim 1 in which at least 90% by moles of the groups denoted by $R^1$ in the component (a) are methyl groups.

9. The base fabric for air bags as claimed in claim 1 wherein the aqueous emulsion has a viscosity in the range form 10,000 to 50,000 centipoise at 25° C.

10. The base fabric for air bags as claimed in claim 1 in which the amount of the coating layer is in the range from 20 to 50 g/m² as dried.

11. The base fabric for air bags as claimed in claim 1 in which the water-soluble polymer is carboxymethyl cellulose.

12. The base fabric for air bags of claim 1, wherein the organohydrogen polysiloxane, (b), is of the following formula:

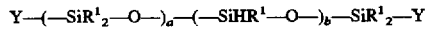

wherein $R^1$ is as defined, Y is a hydrogen atom or independently has a meaning of $R^1$ and a and b are each a positive integer not exceeding 1000, provided that, when b is 1, each Y is a hydrogen atom and, when b is 2, at least one Y is a hydrogen atom.

13. The base fabric for air bags of claim 1, wherein the woven fabric web of synthetic fiber is of a polyamide, polyester, acrylic or aramid fiber.

14. The base fabric for air bags of claim 1, wherein the woven fabric web has a coating layer on only one side.

15. The base fabric for air bags of claim 1, wherein the organopolysiloxane composition is free from an organic solvent.

16. The base fabric for air bags of claim 1, wherein in the organopolysiloxane, (a), each $R^1$ is independently a saturated aliphatic or alicyclic hydrocarbon group of 1–20 carbon atoms optionally substituted by halogen atoms or epoxy, carboxyl or amino groups.

17. The base fabric for air bags of claim 1, wherein in the organopolysiloxane, (a), each $R^1$ is a methyl group.

18. An air bag for an automobile which is a foldable and inflatable bag formed by sewing together pieces of a base fabric which comprises:

(A) a woven fabric web of a synthetic fiber; and (B) a coating layer formed on at least one surface of the woven fabric web as the component (A) which is a layer cured from an organopolysiloxane composition in the form of an aqueous emulsion comprising:

(a) 100 parts by weight of an organopolysiloxane, as an anionic emulsion polymerization product, represented by the general formula

in which $R^1$ is, independently from the others, a monovalent hydrocarbon group having 1 to 20 carbon atoms optionally substituted by halogen atoms or epoxy, carboxyl, amino or methacryl groups, each Z is, independently from the other, $R^1$, $OR^2$ or $—(—O—SiR^1_2)_k—$ $OR^2$, $R^2$ being a hydrogen atom or $R^1$ and the subscript k being a positive integer not exceeding 1,000, each X is, independently from the other, $R^1$ or $OR^2$, the subscript m is a positive integer of 100 to 10,000 and the subscript n is 0 or a positive integer not exceeding 1,000 and which contains at least two groups denoted by $OR^2$ in a molecule;

(b) from 0.5 to 50 parts by weight of an organohydrogen polysiloxane, as an aqueous emulsion product, having, in a molecule, at least three hydrogen atoms directly bonded to the silicon atoms, (c) from 0.5 to 100 parts by weight of a finely divided silica filler, as a colloidal silica aqueous dispersion;

(d) from 0.1 to 20 parts by weight of an alkoxy silane compound having, in a molecule, at least one amido group and at least one carboxyl group or a partial hydrolysis-condensation product thereof;

(e) from 0.1 to 20 parts by weight of an alkoxy silane compound having, in a molecule, at least one epoxy group or at least one amino group or a partial hydrolysis-condensation product thereof;

(f) from 0.01 to 10 parts by weight of a curing catalyst for the composition, which is a metal salt of an organic acid or an amine compound; and (g) a water-soluble polymer thickening agent;

the aqueous emulsion having a viscosity in the range from 2,000 to 100,000 centipoise at 25° C. and the amount of the coating layer being in the range from 10 to 100 g/m² as dried.

19. The air bag of claim 18, wherein in the organopolysiloxane, (a), each $R^1$ is independently a saturated aliphatic or alicyclic hydrocarbon group of 1–20 carbon atoms optionally substituted by halogen atoms or epoxy, carboxyl or amino groups.

20. The air bag of claim 18, wherein in the organopolysiloxane, (a), each $R^1$ is a methyl group.

* * * * *